US012763699B2

(12) United States Patent
Briff et al.

(10) Patent No.: US 12,763,699 B2
(45) Date of Patent: Oct. 13, 2026

(54) ELECTRICAL POWER SYSTEM

(71) Applicant: ROLLS-ROYCE plc, London (GB)

(72) Inventors: Pablo A Briff, Derby (GB); David R Trainer, Derby (GB)

(73) Assignee: ROLLS-ROYCE PLC, London (GB)

(*) Notice: Subject to any disclaimer, the term of this patent is extended or adjusted under 35 U.S.C. 154(b) by 0 days.

(21) Appl. No.: 18/977,027

(22) Filed: Dec. 11, 2024

(65) Prior Publication Data

US 2025/0226760 A1 Jul. 10, 2025

(30) Foreign Application Priority Data

Jan. 4, 2024 (GB) ..................................... 2400096

(51) Int. Cl.

| | |
|---|---|
| ***H02M 7/219*** | (2006.01) |
| ***B64D 31/16*** | (2024.01) |
| ***H02M 1/32*** | (2007.01) |
| ***H02M 1/36*** | (2007.01) |
| ***H02M 3/335*** | (2006.01) |

(52) U.S. Cl.

CPC ............ *H02M 7/219* (2013.01); *B64D 31/16* (2024.01); *H02M 1/325* (2021.05); *H02M 1/36* (2013.01); *H02M 3/33576* (2013.01)

(58) Field of Classification Search

CPC .... H02M 1/325; H02M 1/36; H02M 3/33576; H02M 7/219; B64D 31/16

USPC .......................................................... 307/9.1

See application file for complete search history.

(56) References Cited

U.S. PATENT DOCUMENTS

| | | | | |
|---|---|---|---|---|
| 2004/0160792 | A1 | 8/2004 | Youm et al. | |
| 2023/0283169 | A1 | 9/2023 | Chen et al. | |
| 2023/0365012 | A1* | 11/2023 | Namuduri ............... | B60L 53/24 |

OTHER PUBLICATIONS

Aug. 19, 2024 Search Report issued in British Patent Application No. GB2400096.0.

* cited by examiner

*Primary Examiner* — Hal Kaplan

(74) *Attorney, Agent, or Firm* — Oliff PLC

(57) ABSTRACT

An electrical power system includes: an electrical power source; power converter connected, at an input side, to the electrical power source and including first and second DC output terminals and a capacitor connected between the output terminals; a DC electrical network having first and second input terminals; a resistor; and switch arrangement including several switches. The switch arrangement has: a first configuration in which the resistor is connected in series between the first output terminal of the power converter and the first input terminal of the DC electrical network; a second configuration in which the first output terminal of the power converter is connected to the first input terminal of the DC electrical network bypassing the resistor; and a third configuration in which the resistor is connected in parallel across the capacitor. The electrical power system further includes a control system for controlling a configuration of the switch arrangement.

20 Claims, 9 Drawing Sheets

ELECTRICAL POWER SYSTEM

This disclosure claims the benefit of UK Patent Application No. GB 2400096.0, filed on 4 Jan. 2024, which is hereby incorporated herein in its entirety.

BACKGROUND

Technical Field

This disclosure relates to an electrical power system and to a method of operating an electrical power system.

Background of the Disclosure

Power electronics converters, including AC:DC power converters and DC:DC power converters, are used to interface between two parts of an electrical power system. Power converters typically include one or more power semiconductor switches (e.g., MOSFETs) and one or more capacitors.

An AC:DC power converter, used herein to encompass rectifiers, inverters, and bi-directional AC:DC converters, may be used to interface between an AC portion of an electrical power system and a DC portion of an electrical power system. For example, electrical power generated by a rotary electrical machine may be converted to DC by an AC:DC power converter for power distribution purposes, e.g., in a DC electrical network. As another example, an AC:DC power converter may provide an interface between an AC power distribution network and a DC power distribution network.

A DC:DC power converter may be used to interface between two DC parts of an electrical power system. For example, an electrical power system may have two DC electrical networks with different operating voltages, and a DC:DC converter may provide an interface between the two networks so that power can be exchanged between them. In another example, an electrical power system may include a DC electrical network that is supplied with power by an energy storage system (e.g., a battery). The terminal voltage of a battery typically decreases with its state of charge, so a DC:DC converter may be provided between the terminals of the energy storage system and the DC electrical network to stabilise the voltage supplied to the DC electrical network as the battery discharges.

SUMMARY

According to a first aspect, there is an electrical power system, comprising:

an electrical power source;

a power converter connected, at an input side, to the electrical power source and comprising first and second DC output terminals and a capacitor connected between the first and second output terminals;

a DC electrical network having a first input terminal and a second input terminal;

a resistor;

a switch arrangement comprising a plurality of switches having:

- a first configuration in which the resistor is connected in series between the first output terminal of the power converter and the first input terminal of the DC electrical network;
- a second configuration in which the first output terminal of the power converter is connected to the first input terminal of the DC electrical network bypassing the resistor; and
- a third configuration in which the resistor is connected in parallel across the capacitor;

wherein the electrical power system further comprising a control system for controlling a configuration of the switch arrangement.

In an embodiment, the control system is configured to: switch the switch arrangement to the first configuration for a start-up sequence of the electrical power system; and switch the switch arrangement from the first configuration to the second configuration when the start-up sequence is complete.

In an embodiment, the control system is configured to: switch the switch arrangement from the second configuration to the third configuration in response to a determination to the effect that a voltage across the capacitor has increased past a threshold.

In an embodiment, control system is further configured to, when the switch arrangement is in the third configuration: in response to a determination to the effect that the voltage across the capacitor has decreased, switch the switch arrangement from the third configuration to the first configuration; and in response to a determination to the effect that the voltage across the capacitor and a voltage between the first and second input terminals of the DC electrical network are approximately equal, switch the switch arrangement from the first configuration to the second configuration.

In an embodiment, the control system is further configured to: switch the switch arrangement from the second configuration to the first configuration in response to a determination to the effect that there is a fault in the DC electrical network.

In an embodiment, the power converter comprises an AC:DC converter circuit comprising a first half-bridge and a second half-bridge, each of the first half-bridge and the second half-bridge comprising a high-side power semiconductor switch and a low-side power semiconductor switch the control system is further configured to control switch states of the power semiconductor switches of the AC:DC converter circuit; and the control system is further configured to, before changing the configuration of the switch arrangement, switch the power semiconductor switches of the AC:DC converter circuit into a crowbar configuration in which only low-side transistors or only high-side transistors of the first and second half-bridges are switched on.

In an embodiment, the switch arrangement comprises: a first switch connected in series between the resistor and the first input terminal of the DC electrical network; a second switch connected in parallel across the resistor and the first switch; and a third switch connected in parallel across the capacitor and between the second input terminal of the DC electrical network and a node located between the resistor and the first switch. In the first configuration, the first is closed and the second and third switches are open. In the second configuration, the second switch is closed and the first and third switches are open. In the third configuration, the second and third switches are closed and the first switch is open.

In an embodiment, the first switch and the third switch each comprise a power semiconductor switch, and the power semiconductor switches are connected in a half-bridge configuration.

In an embodiment, the power semiconductor switches are MOSFETs.

In an embodiment, each of plurality of switches of the switch arrangement comprises two reverse series connected MOSFETs.

In an embodiment, the resistor is a non-linear resistor. The non-linear resistor may be a current limiting diode. The current limiting diode may comprise a JFET.

In an embodiment, the power source is an AC power source and the power converter is an AC:DC power converter. The AC power source may be an electrical machine. The AC:DC power converter may be unidirectional or bidirectional.

In an embodiment, the power source is a DC power source and the power converter is an DC:DC power converter. The DC:DC power converter may be unidirectional or may allow bidirectional power flow.

In an embodiment, the DC power source is a second DC electrical network.

In an embodiment, the DC power source is an energy storage system, for example a battery.

In an embodiment, the DC:DC power converter is a Dual Active Bridge (DAB) DC:DC power converter comprising a DC:AC converter circuit, an AC:DC converter circuit and an AC link connecting respective AC sides of the DC:AC converter circuit and the DC:AC converter circuit.

The control system can take any suitable form. For example, the control system may be a single controller, or multiple distributed controllers. It may be implemented in hardware or a combination of hardware and software.

According to a second aspect, there is an aircraft power and propulsion system comprising the electrical power system of the first aspect.

According to a third aspect, there is an aircraft comprising the electrical power system of the first aspect or the power and propulsion system of the second aspect.

According to a fourth aspect, there is a method of operating an electrical power system according to the first aspect. The method comprises:

- monitoring, by the control system, one or more operating parameters of the electrical power system;
- in response to a change in one or more of the one or more operating parameters, changing a configuration of the switch arrangement.

In an embodiment, the method comprises: switching the switch arrangement to the first configuration for a start-up sequence of the electrical power system; switching the switch arrangement from the first configuration to the second configuration when the start-up sequence is complete; and switching the switch arrangement from the second configuration to the third configuration in response to a determination to the effect that a voltage across the capacitor has increased past a threshold.

In an embodiment, the method further comprises, after switching the switch arrangement to the third configuration: switching the switch arrangement from the third configuration to the first configuration; determining that the voltage across the capacitor and a voltage between the first and second input terminals of the DC electrical network are approximately equal; and switching the switch arrangement from the first configuration to the second configuration.

In an embodiment, the power converter comprises an AC:DC converter circuit comprising a first half-bridge and a second half-bridge, each of the first half-bridge and the second half-bridge comprising a high-side power semiconductor switch and a low-side power semiconductor switch, and the method further comprises: prior to changing the configuration of the switch arrangement, switch a plurality of power semiconductor switches of the AC:DC converter circuit into a crowbar configuration.

The skilled person will appreciate that except where mutually exclusive, a feature described in relation to any one of the above aspects may be applied mutatis mutandis to any other aspect. Furthermore, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
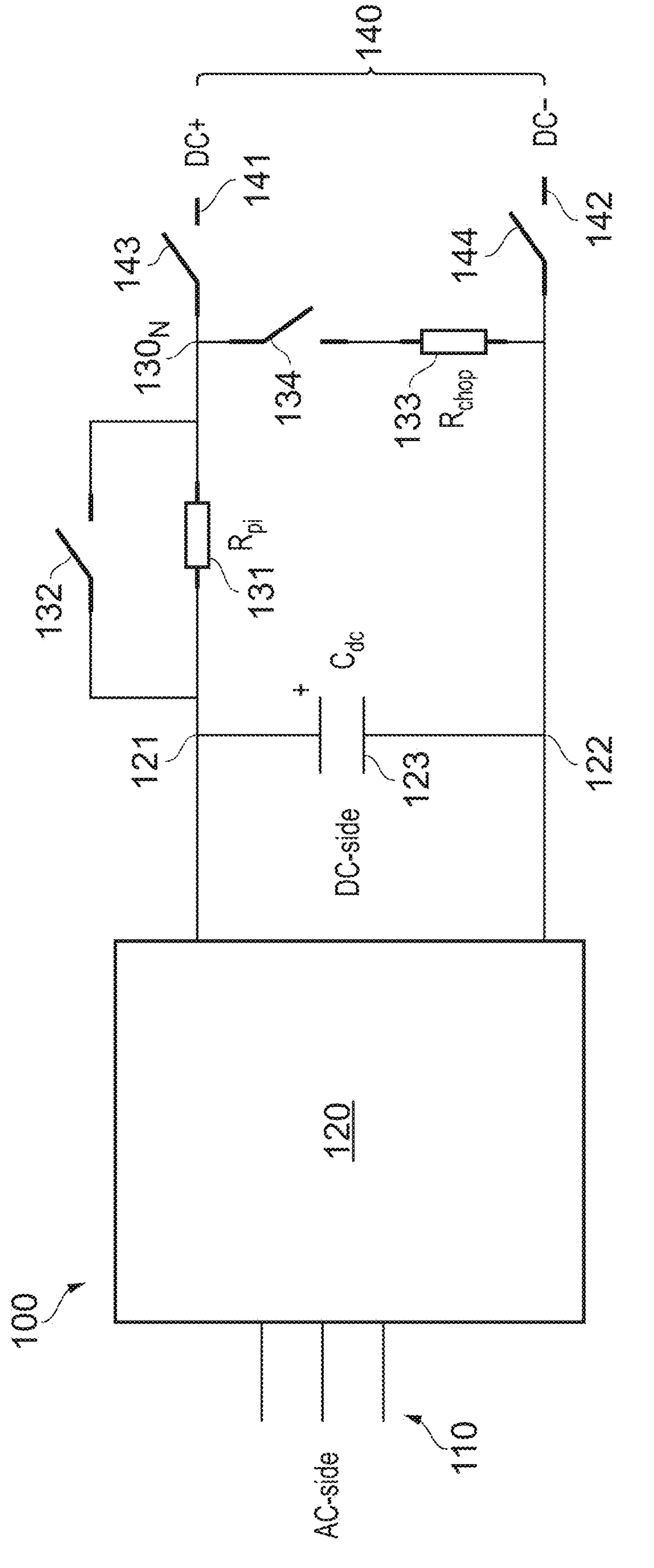
FIG. 1 is a schematic illustration of an electrical power system comprising separate pre-insertion and DC chopper resistors.

FIG. 1 illustrates an electrical power system 100 that includes a power source 110, a DC electrical network 140 and a power converter 120 connected between the power source 110 and the DC electrical network 140. In this example the power source 110 is an AC power source (e.g., an electrical generator), so the power converter 120 is an AC:DC converter. The AC:DC converter 120 is connected at its AC side to the AC power source 110 and is connected at its DC side to the DC electrical network 140. A first (e.g., positive) input terminal 141 of the DC network 140 is connected to a first (e.g., positive) output terminal 121 of the power converter 120. A second (e.g., negative) input terminal 142 of the DC network 140 is connected to a second (e.g., negative) output terminal 122 of the power converter 120. A capacitor 123, often referred to as an output capacitor or DC link capacitor, the function of which will be familiar to those skilled in the art, is connected between the two output terminals 121, 122 of the power converter 120.

During a start-up sequence of the electrical power system 100, when the DC electrical network 140 is first connected to the converter 120 (e.g., by closing switches 143, 144), any difference between the voltage of the DC network 140 ($V_{DC}$) and the voltage across the capacitor 123 will cause an 'inrush current' to flow. The inrush current could be very high and damaging because it would only be limited by the internal series resistance of the capacitor 123 and any stray resistance or inductance in the circuit between the capacitor 123 and the DC network terminals 141, 142. Thus, to limit the inrush current to an acceptable level, an intermediate circuit provided between the power converter 120 and the DC network 140 includes a pre-insertion resistor 131, which may be connected in series between the first output terminal 121 of the power converter 120 and the first input terminal 141 of the DC network 140. Typically, the inrush current is limited to the rated nominal current of the system, $I_{rated}$, such that a typical value for the resistance of the pre-insertion resistance is given by:

$$I_{inrush} = I_{rated} = \frac{V_{dc}}{R_{pi}}$$

$$R_{pi} = \frac{V_{dc}}{I_{rated}}$$

This corresponds to the case when either the capacitor 123 or the voltage across the terminals 141, 142 of the DC network 140 is completely charged to the maximum allowable voltage, and the other element (i.e., capacitor 123 or DC network 140) is completely discharged (zero voltage). Once the capacitor 123 and the DC network 140 have the same steady-state voltage, the pre-insertion resistor 131 is bypassed by closing the switch 132. This avoids the resistive losses and voltage drop that would be incurred if the pre-insertion resistor 131 was left in the circuit during normal operation.

Another, entirely separate, phenomenon in an electrical power system 100 of this type is over-charging of the capacitor 123 due to 'load rejection'. This is where the load of the DC electrical network 140 is unable to absorb some or all of the power from the power source 110. When this occurs, if no further action is taken, the power is instead stored as potential energy in the capacitor 123. This causes the voltage across the capacitor 123 to increase beyond safe levels, which may initiate a protective action that blocks and trips the power converter 120 to protect the capacitor 123 from damage. To mitigate, a second resistor 133, sometimes referred to as a DC chopper resistor or braking chopper resistor, may be provided in the intermediate circuit between the capacitor 123 and DC network 140. If load rejection is detected (e.g., the voltage across the capacitor 123 increases above a threshold), a switch 134 is closed to connect the DC chopper resistor 133 to node 130N to be in parallel across the capacitor 123. The DC chopper resistor dissipates the excess power until normal operation resumes. The DC chopper resistor value is typically chosen to be rated for nominal DC power, at nominal DC voltage, i.e., conducting the rated nominal current:

$$R_{chop} = \frac{V_{dc}}{I_{rated}}$$

Figure 2:
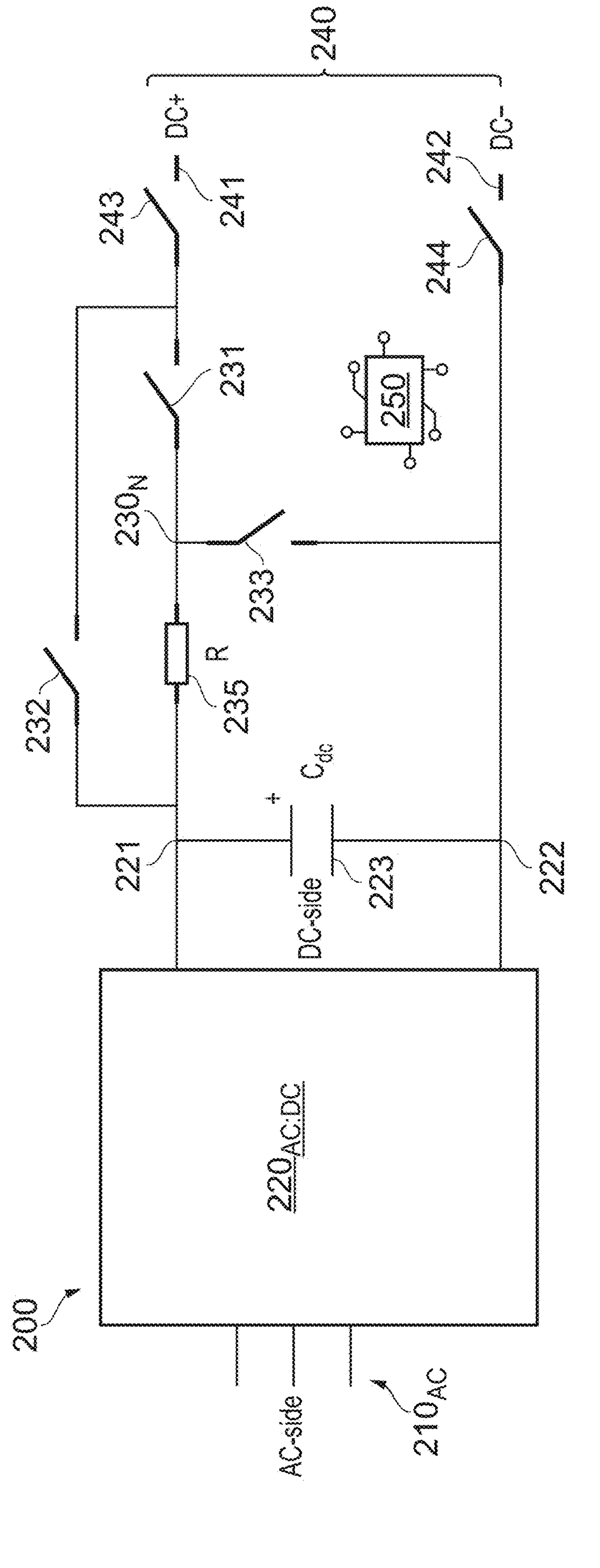
FIG. 2 is a schematic illustration of an electrical power system comprising a combined pre-insertion and DC chopper resistor.

From the above, while the pre-insertion resistor 131 and the DC chopper resistor 133 serve completely different purposes, and their resistance values are selected based on different criteria, they may have equal or approximately equal resistance values. Further, their respective conditions of use will rarely occur at the same time. Referring now to FIG. 2, in accordance with the present disclosure, the two resistors 131, 133 of the intermediate circuit may be replaced by a single resistor 235 and a switch arrangement that allows suitable connection of the resistor 235 according to the condition of the electrical power system 200. Such an approach may reduce the mass of the electrical power system 200, which may be of particular advantage in weight-sensitive aircraft applications, especially where there the system includes multiple power converters $\mathbf{220}_{AC:DC}$ such that weight savings stack up. It may also reduce duplication of cooling systems and heat sinks that may be required to manage the thermal dissipation of the resistors.

The resistor 235 may be selected to have a resistance value, R, of approximately:

$$R = \frac{V_{dc}}{I_{rated}}$$

In one example, the resistor 235 is a conventional, linear resistor. In another example, the resistor 235 is a non-linear resistor such as a current limiting diode (CLD), which may comprise a JFET. CLDs are described in EP 4174952 A1, EP 4174953 A1 and EP4175091 A1, for example.

In the illustrated example, the switch arrangement includes three switches 231, 232, 233. The resistor 235 is connected between the first output terminal 221 of the power converter $\mathbf{220}_{AC:DC}$ and the first input terminal 241 of DC electrical network 240, and the first switch 231 is connected in series between the resistor 235 and the first input terminal 241 of the DC electrical network 240. The second switch 232 is connected in parallel across the resistor 235 and the first switch 231. The third switch 233 is connected in parallel across the capacitor 235 and between the second output terminal 222 of the power converter $\mathbf{220}_{AC:DC}$ and a node 230N located between the resistor 235 and the first switch 231.

In a first configuration of the switch arrangement, the first switch 231 is closed and the second and third switches 232, 233 are open. This connects the resistor 235 in series between the first output terminal 221 of the power converter $\mathbf{210}_{AC:DC}$ and the first input terminal 241 of the DC electrical network 240. In the first configuration the resistor 235 acts like the pre-insertion resistor 131 described above, so this configuration may be used at start-up of the system 200.

In a second configuration of the switch arrangement, the second switch 232 is closed and the first and third switches 231, 233 are open. This connects the first output terminal 221 of the power converter $\mathbf{220}_{AC:DC}$ to the first input terminal 241 of the DC electrical network 240 bypassing the resistor 235. In the second configuration the resistor 235 is isolated, so this configuration may be used during normal operation of the system.

In a third configuration, the second and third switches 232, 233 are closed and the first switch 231 is open. This connects the resistor 235 in parallel across the output capacitor 223. In the third configuration the resistor 235 acts like the DC chopper resistor 133 described above, and this configuration may be used if a load rejection event occurs.

The switches 231, 232, 233, which are controlled by a control system 250, may take any suitable form including mechanical DC contactors or power semiconductor switches, e.g., MOSFETs, such as two reverse series connected MOSFETs to form a true AC switch, or a single GaN device. In one example, the first and third switches 231, 233 are power semiconductor switches and are connected in a half-bridge configuration. Each of the switches 231, 233 may be a single power semiconductor switch or may comprise multiple power semiconductor switches connected in parallel, e.g., to provide a higher current rating.

The control system 250 may include a discrete-time controller, an FPGA, or a microprocessor, for example. The switches 231-233 could also be controlled using analogue electronics hardware, for example to provide a fast response in the event of a DC fault. For example, in the event of a DC fault where the voltage across the network input terminals 241, 242 collapses below a predefined threshold, an analogue DC voltage measurement circuit may be used to initiate an open command to the second switch 232 while simultaneously issuing a close command to the first switch 231, to limit the DC-link capacitor outrush current.

Figure 3A:
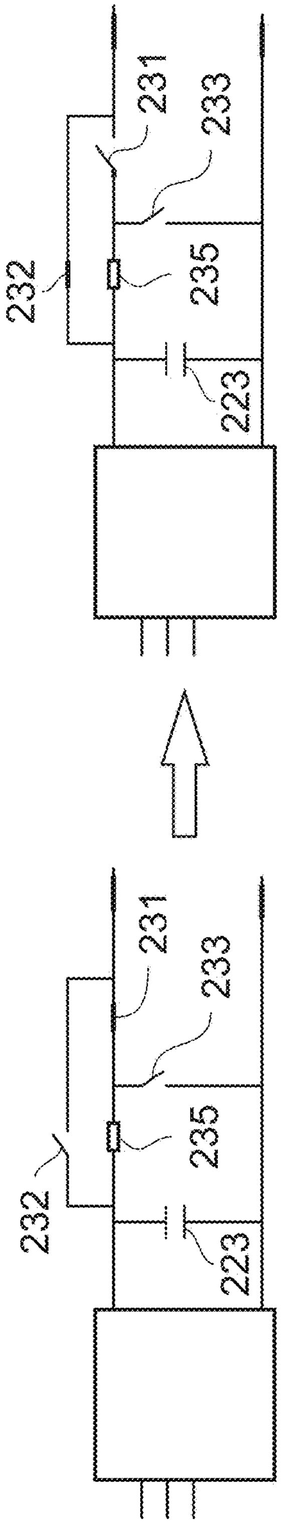
FIG. 3A illustrates how the electrical power system of FIG. 2 may be switched from a soft-start configuration to a normal configuration.

FIG. 3A illustrates, in the left-hand portion, the switch arrangement in the first configuration for a 'soft-start', i.e., a start in which the resistor 235 limits the inrush current. The first switch 231 is closed while the second and third switches 232, 233 are open. FIG. 3A further illustrates the configuration of the switch arrangement changing from the first configuration (soft-start) to the second configuration for normal operation. In the second configuration, the second switch is closed while the first and second switches 231, 233 are open.

Figure 3B:
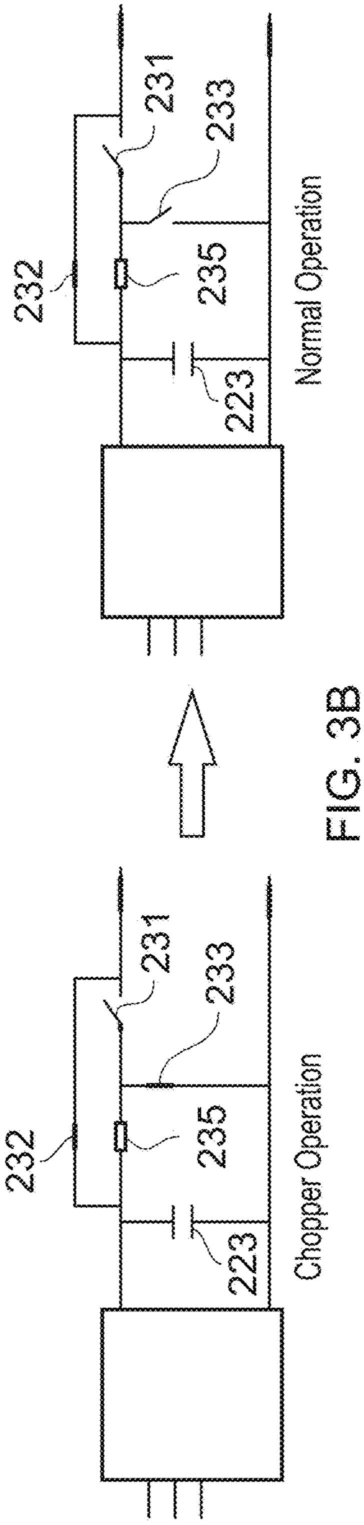
FIG. 3B illustrates how the electrical power system of FIG. 2 may be switched from a chopper configuration to a normal configuration.

FIG. 3B illustrates, in the left-hand portion, the switch arrangement in the third configuration, i.e., the chopper configuration in which the resistor 235 prevents overcharging of the capacitor 223. The first switch 231 is open while the second and third switches 232, 233 are closed. FIG. 3B further illustrates the configuration of the switch arrangement changing from the third configuration (chopper operation) to the second configuration when the system is ready for normal operation.

Figure 3C:
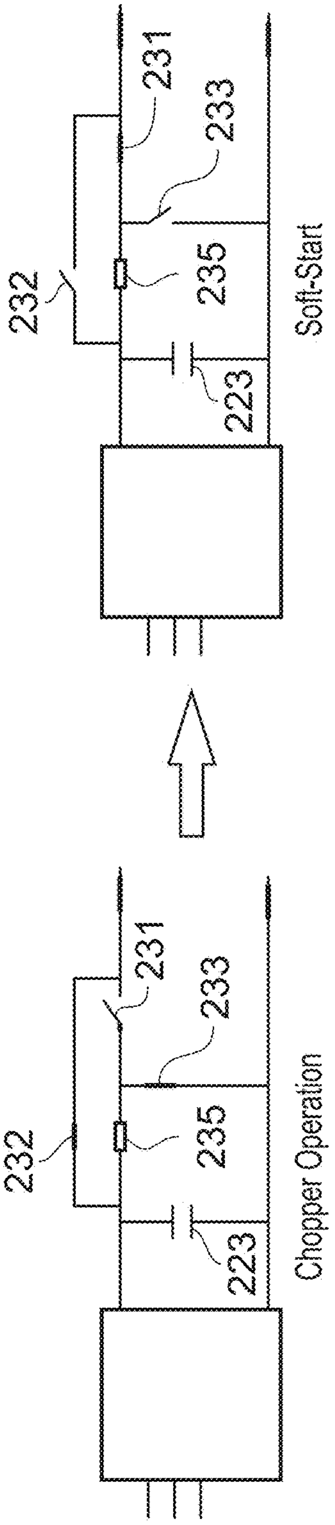
FIG. 3C illustrates how the electrical power system of FIG. 2 may be switched from a chopper configuration to a soft-start configuration.

FIG. 3C again illustrates, in the left-hand portion, the switch arrangement in the third configuration, i.e., the chopper configuration. FIG. 3C further illustrates the configuration of the switch arrangement changing from the third configuration (chopper operation) to the first configuration (i.e., soft-start). The configuration may be changed to the soft-start configuration, rather than to the normal configuration, to equalize the voltage across the capacitor 123 and the voltage of the DC network 140, prior to the resumption of normal operation. This may avoid outrush or inrush currents that could be caused by a voltage difference.

Figure 4:
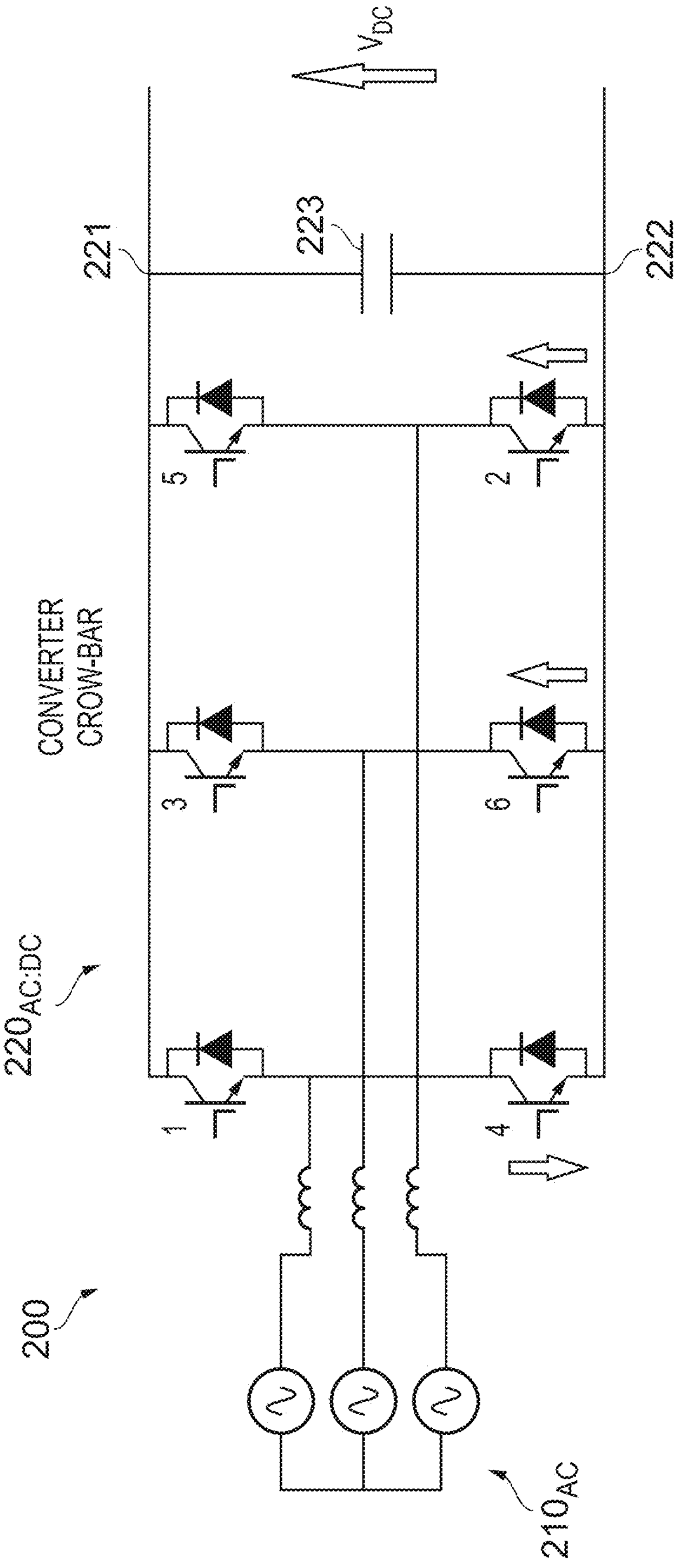
FIG. 4 illustrates a crow-bar configuration of an AC:DC power converter which may be used before changing the configuration of the electrical power system.

In some examples, when the control system 250 determines a condition to the effect that the configuration of the switching arrangement should be changed (e.g., there is a DC network fault or the voltage across the capacitor 223 has passed a threshold), the control system 250 may first place power converter $\mathbf{220}_{AC:DC}$ into a crowbar configuration. In a crowbar configuration, power from the power source $\mathbf{210}_{AC}$ is contained within the power circuit of the converter 220 and cannot reach the intermediate circuit, which includes the switch arrangement. Utilizing the crowbar configuration in this way may improve voltage control and reduce transient current flow during the subsequent change in the switching configuration. FIG. 4 illustrates a crowbar configuration for the case where the power converter $\mathbf{220}_{AC:DC}$ is of the three-phase full-bridge type. This is not intended to be limiting, as many suitable converter circuit topologies are known and will occur to those skilled in the art. In the crowbar configuration, only low-side power semiconductor switches (labelled 2, 4 and 6) or only high-side power semiconductor switches (labelled 1, 3, 5) of the three half-bridges are switched on.

Figure 5A:
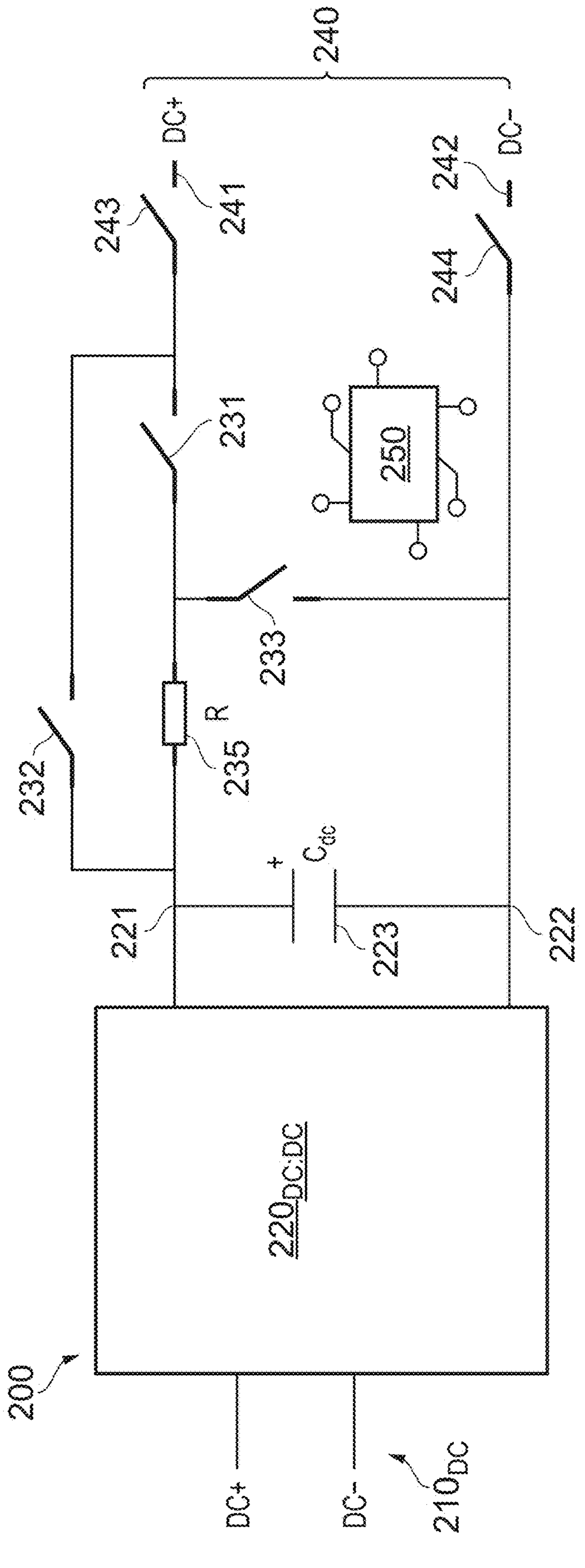
FIG. 5A illustrates the electrical power system of FIG. 2 but with a DC:DC converter instead of an AC:DC converter.

In the examples described above, the power source is an AC power source $\mathbf{210}_{AC}$ and the power converter is an AC:DC power converter 220 AC:DC. The present disclosure is, however, not so limited and could equally be applied to a DC power source (e.g., an energy storage system such as a battery) and a DC:DC power converter. This is shown in FIG. 5A, which is identical to FIG. 2 except the power source is a DC power source $\mathbf{210}_{DC}$ and the power converter is a DC:DC power converter $\mathbf{220}_{DC:DC}$.

Figure 5B:
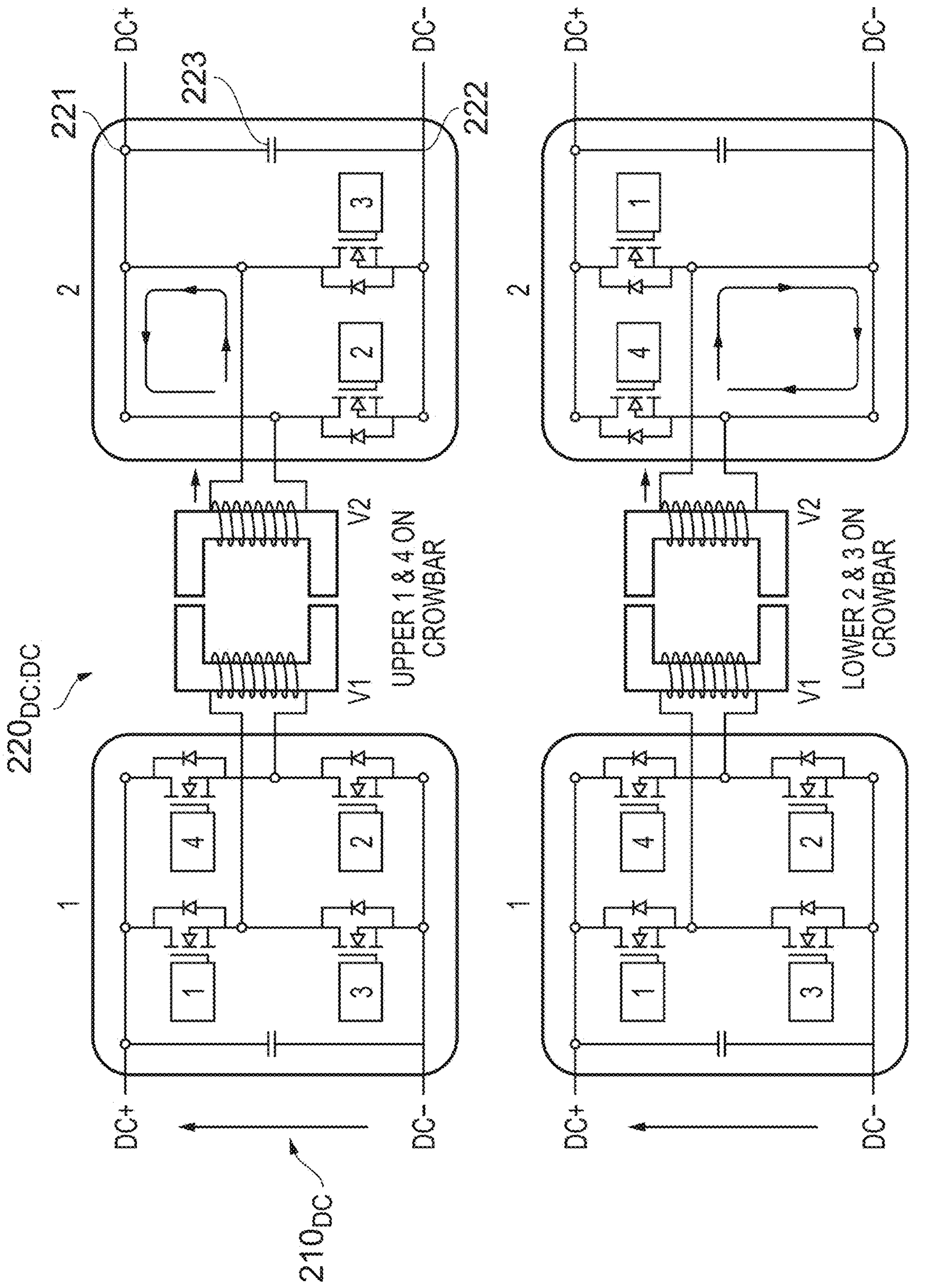
FIG. 5B illustrates crow-bar configurations of a Dual Active Bridge (DAB) DC:DC power converter.

The use of the crowbar configuration, described above with reference to FIG. 4 for an AC:DC converter $\mathbf{220}_{AC:DC}$, may also be applied to the case of a DC:DC converter $\mathbf{220}_{DC:DC}$. For example, as illustrated in FIG. 5B, the DC:DC converter $\mathbf{220}_{DC:DC}$ may be a Dual Active Bridge (DAB) DC:DC converter. The DAB DC:DC converter includes a DC:AC converter circuit and an AC:DC converter circuit connected by an AC link, which in this example includes an isolating transformer. The crowbar configuration may be implemented by switching the power semiconductor switches of the AC:DC converter circuit into the crowbar configuration. In this example, the AC:DC converter circuit is a full-bridge circuit comprising two half-bridges, and the crowbar configuration is applied by switching on either only the low-side power semiconductor switches (labelled 2, 3) or only the high-side low-side power semiconductor switches (labelled 1, 4).

In each of the above examples, the switch arrangement consists of three switches, 231, 232 and 233. While this arrangement may have advantages in terms of limiting the number of switches required to implement the described functionality, it is not intended to be limiting. Alternative arrangements of switches will occur to those skilled in the art.

The present disclosure may be applied to any electrical power system comprising an AC:DC converter and/or a DC:DC converter. Example electrical power systems, used in the power and propulsion systems of aircraft, are described with reference to FIGS. 6A-6C.

Figure 6A:
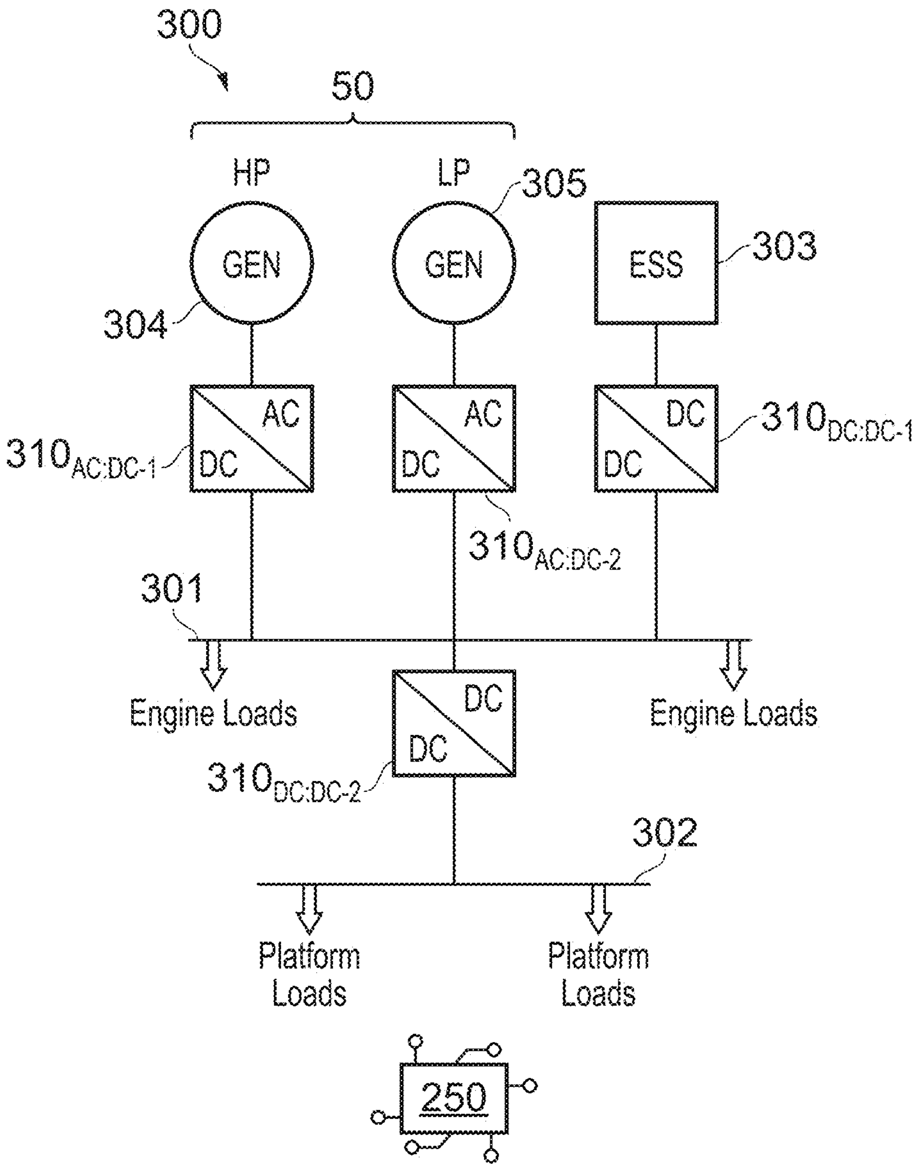
FIG. 6A is a schematic illustration of an electrical power and propulsion system of an aircraft comprising a gas turbine engine.

FIG. 6A illustrates a power and propulsion system 300 of an aircraft. The system 300 includes two DC networks: a first, higher voltage (e.g., 540 $V_{dc}$), DC network 301 that supplies power to electrical loads associated with a gas turbine engine 50 and a second, lower voltage (e.g., 270 $V_{dc}$), DC network 302 that supplies platform electrical loads. The first DC network 301 is supplied with power, via AC:DC converters $\mathbf{310}_{AC:DC\text{-}1}$, $\mathbf{310}_{AC:DC\text{-}2}$ from first and second electrical generators 304, 305 that are coupled to the high-pressure (HP) and low-pressure (LP) spools of the gas turbine engine 50. The first DC network 301 is also supplied with power by an energy storage system, ESS, 303, and a first DC:DC power converter $\mathbf{310}_{DC:DC\text{-}1}$ is connected between the terminals of the ESS 303 and the first DC network 301 to account for variation in the terminal voltage of the ESS 303 as it charges and discharges. A second DC:DC power converter $\mathbf{310}_{DC:DC\text{-}1}$ is connected between the first and second DC networks 301, 302 for power exchange therebetween. Depending on the configuration of the AC:DC converters $\mathbf{310}_{AC:DC\text{-}1}$, $\mathbf{310}_{AC:DC\text{-}2}$ and the DC:DC converters $\mathbf{310}_{DC:DC\text{-}1}$, $\mathbf{310}_{DC:DC\text{-}2}$, power flow may be unidirectional or bi-directional. The system further includes a control system 250 which, as described above, controls switch arrangements associated with any one or more of the power converters $310_{AC:DC-1}$, $310_{AC:DC-2}$, $310_{DC:DC-1}$, $310_{DC:DC-2}$.

Figure 6B:
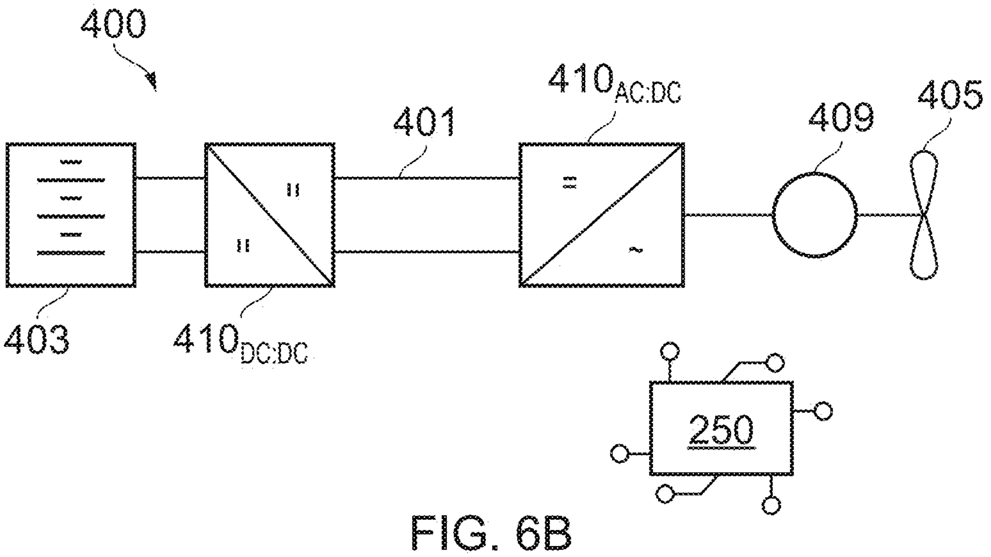
FIG. 6B is a schematic illustration of an electrical power and propulsion system of an electric aircraft.
Figure 6C:
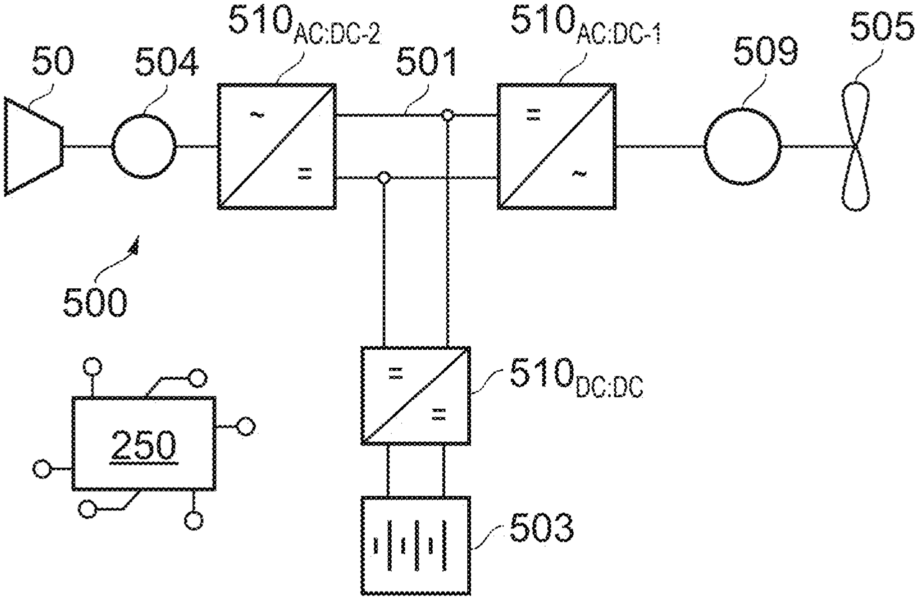
FIG. 6C is a schematic illustration of an electrical power and propulsion system of a hybrid-electric aircraft.

FIG. 6B shows, in schematic form, a purely electrical power and propulsion system 400 of an aircraft. The system 400 includes a propulsor 405 (e.g., a propeller or fan), whose rotation is driven by an electrical machine 409. The electrical machine 409 receives electrical power from a DC network 401 via a AC:DC power converter $410_{AC:DC}$. The DC network 401 is supplied with power by an energy storage system 403. A DC:DC converter $410_{DC:DC}$ provides an interface between the energy storage system 403 and the DC network 401. Control of the system, including control of switch arrangements associated with one or both of the power converters $410_{AC:DC}$, $410_{DC:DC}$, is performed by the control system 150.

FIG. 6C shows, again in schematic form, a hybrid electrical power and propulsion system 500 of an aircraft. The system 500 includes a propulsor 505 whose rotation is driven by an electrical machine 509. The electrical machine 509 receives electrical power from a DC network 501 via a AC:DC power converter $510_{AC:DC-1}$. The DC network 501 is supplied with power by two sources: an energy storage system 503 and a generator set including a gas turbine engine 50, an electrical generator 504 coupled to a shaft of the gas turbine engine 50 and an AC:DC converter $510_{AC:DC-2}$. A DC:DC converter $510_{DC:DC}$ provides an interface between the energy storage system 503 and the DC network 501. The DC:DC converter $510_{DC:DC}$ may be bi-directional to facilitate charging of the energy storage system 503 using power from the generator set, in addition to discharge of the battery to the DC network 501. Control of the system, including control of switch arrangements associated with one or more of the power converters $510_{AC:DC-1}$, $510_{AC:DC-2}$, $510_{DC:DC}$, is performed by the control system 250. Those skilled in the art will recognise the propulsion system 500 of FIG. 6C to be of the series hybrid type. Other hybrid electric propulsion systems are of the parallel type, while still others are of the turboelectric type or have features of more than one type.

Figure 7:
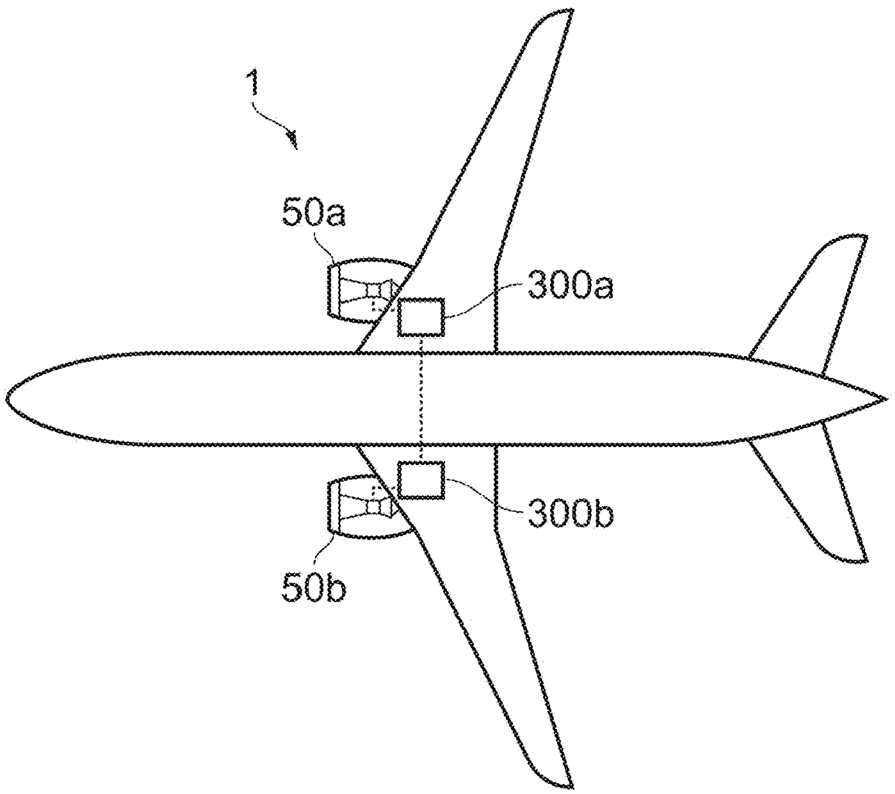
FIG. 7 is a schematic plan view of an aircraft.

FIG. 7 shows an aircraft 1 that includes first and second gas turbine engines 50*a*, 50*b*. The engines 50*a*, 50*b* are associated with electrical power systems 300*a*, 300*b*, which may of the type shown in FIG. 6A or a variant thereof. As illustrated by the dotted lines, the electrical power systems 300*a*, 300*a* may be connected. For example, each electrical power system 300*a*, 300*b* may have a platform DC electrical network 302 and these may be connected or connectable via bus ties. The gas turbine engines 50*a*, 50*b* may be of any suitable configuration, for example they may be two-spool, three-spool or geared turbofans having one, two or more shaft-coupled electrical machines 304, 305.

Figure 8:
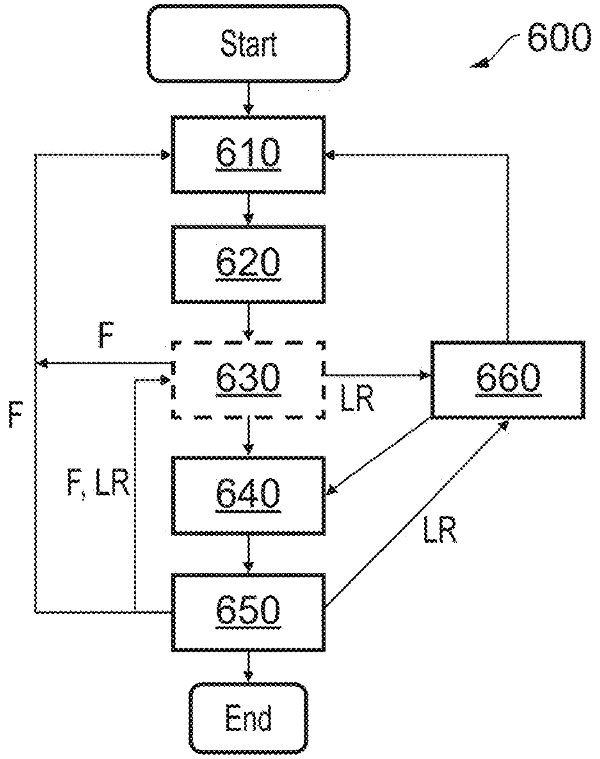
FIG. 8 is a flow chart illustrating a method of operating an electrical power system.

FIG. 8 is a flow chart illustrating a method 600 of operating an electrical power system 200 of the type described herein. The electrical power system 200 may be an aircraft electrical power system, for example one of the types shown in FIGS. 6A-6C. Alternatively, it may be an electrical power system for another transport application (e.g., a vehicle, ship, or train) or of a non-transport application. The system 200 includes a power converter $220_{AC:DC}$, $220_{DC:DC}$ that is connected, at one side, to a power source $210_{AC}$, $210_{DC}$, and at another side to a DC electrical network 240 via an intermediate circuit that includes a switch arrangement. The method 600 takes place under the control of a control system 250, which may take any desired form suitable for the application, e.g., a distributed control system or a single controller.

The method 600 may start with the electrical power system 200 shut down, for example with the switches 243, 244 open so that the DC network 240 and the power source $210_{AC}$, $210_{DC}$ are not connected. The control system 250 may then initiate a start-up sequence, for example by instructing the switches 243, 244 to close. It should be appreciated that switches 243, 244 are optional. They may be included, for example where it is desirable to provide galvanic disconnection between the power converter and the DC network 240, but this is not essential.

At 610, the control system 250 switches the switch arrangement into the first configuration in which the resistor 235 is connected in series between the first output terminal 221 of the power converter $220_{AC:DC}$, $220_{DC:DC}$ and the first input terminal 241 of the DC electrical network 240. In the first configuration, the resistor 235 behaves as a pre-insertion resistor that limits the inrush/outrush current that can occur, e.g., at start-up, due to a difference in the voltage across the capacitor 223 and the DC network 240. In other examples described below, the first configuration may be used in another circumstance in which the current limiting function is desirable.

At 620, the control system 250 waits for the voltages across the capacitor 223 and the terminals 241, 242 of the DC network 240 to equalize. In one example, the control system monitors and compares the voltages across the capacitor 223 and the terminals 241, 242 of the DC network 240 and determines when they are equal or approximately equal. In another example, the control system 250 monitors the current through the resistor 235 and determines when it is zero or below a threshold. When the voltages have equalized (i.e., approximately equalized, for example to within a predefined tolerance), the method proceeds to step 640, either directly or via optional step 630.

At optional step 630, the control system 250 controls the switching states of the power semiconductor switches of the power converter $220_{AC:DC}$, $220_{DC:DC}$ to place the converter in a crowbar configuration. For example, the control system 250 may switch on only low-side or only high-side power semiconductor switches of a bridge circuit of the power converter $220_{AC:DC}$, $220_{DC:DC}$. The crowbar configuration prevents current from the power source $210_{AC}$, $210_{DC}$ from flowing through the intermediate circuit during a subsequent change in the configuration of the switch arrangement.

At 640, the control system 250 switches the switch arrangement into the second configuration, in which the first output terminal 221 of the power converter $220_{AC:DC}$, $220_{DC:DC}$ is connected to the first input terminal 241 of the DC electrical network 240, bypassing the resistor 235. The system 200, including the converter $220_{AC:DC}$, $220_{DC:DC}$, can now be operated as normal.

At 650, the control system 250 monitors one or more operating parameters of the electrical power system 200 to detect changes in its operating condition. In some examples, no changes are detected and the method 600 ends. In other examples:

- The control system 250 detects a fault ("F" in FIG. 8) in the DC network 240, for example by detecting a sudden drop in the voltage across the network terminals 241, 242. In this case, the method proceeds to step 610, optionally via step 630. At step 610, the first configuration of the switch arrangement is used so that the resistor 235 limits the fault current that flows to the DC network 240. At optional intermediate step 630, the power converter $220_{AC:DC}$, $220_{DC:DC}$ is placed in the crowbar configuration before switching to the first configuration. In some examples, the crowbar configuration may itself be used to limit or prevent the flow of fault current to the network 240, and the first, pre-insertion, configuration of the switch arrangement may be used to restart the system 200 when the fault has been isolated. The method 600 may then proceed to step 640 (normal operation in the second configuration), optionally via step 630 (converter crowbar configuration).

The control system 250 detects the occurrence of load rejection ("LR" in FIG. 8), for example by detecting that a voltage (e.g., the voltage or a rate of change of the voltage) across the capacitor 230 has passed a threshold. In this case, the method proceeds to step 660, optionally via step 630. At step 660, the switch arrangement is switched into the third configuration in which the resistor 235 is connected in parallel across the capacitor 223 and so the resistor behaves as a braking chopper resistor, limiting the overcharging of the capacitor 235. At optional intermediate step 630, the power converter $\mathbf{220}_{AC:DC}$, $\mathbf{220}_{DC:DC}$ is placed in the crowbar configuration before switching to the third configuration.

From step 660, the method 600 may proceed to step 640 (normal operation in the second configuration), optionally via step 630 (converter crowbar configuration, not shown in the flow chart of FIG. 8). Alternatively, the method 600 may instead proceed to step 610 (pre-insertion operation in the first configuration), optionally via step 630 (converter crowbar configuration, again not shown in the flow chart of FIG. 8). Operating the system 200 in the pre-insertion configuration (step 610) prior resuming normal operation (step 640) may limit the inrush current, which may occur if the load rejection detected at step 650 created a difference in the capacitor and network voltages.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

It will also be appreciated that whilst the invention has been described with reference to aircraft and aircraft power and propulsion systems, the techniques described herein could be used for many other applications. These include, but are not limited to, automotive, marine and land-based applications.

We claim:

1. An electrical power system, comprising:

an electrical power source;

a power converter connected, at an input side, to the electrical power source and comprising first and second DC output terminals and a capacitor connected between the first and second output terminals;

a DC electrical network having a first input terminal and a second input terminal;

a resistor;

a switch arrangement comprising a plurality of switches having:

a first configuration in which the resistor is connected in series between the first output terminal of the power converter and the first input terminal of the DC electrical network;

a second configuration in which the first output terminal of the power converter is connected to the first input terminal of the DC electrical network bypassing the resistor; and a third configuration in which the resistor is connected in parallel across the capacitor, wherein:

the electrical power system further comprises a control system for controlling a configuration of the switch arrangement, and the first output terminal of the power converter, one end of the capacitor, and one end of the resistor are all connected to a common node.

2. The electrical power system of claim 1, wherein the control system is configured to:

switch the switch arrangement to the first configuration for a start-up sequence of the electrical power system; and switch the switch arrangement from the first configuration to the second configuration when the start-up sequence is complete.

3. The electrical power system of claim 1, wherein the control system is configured to:

switch the switch arrangement from the second configuration to the third configuration in response to a determination to the effect that a voltage across the capacitor has increased past a threshold.

4. The electrical power system of claim 3, wherein the control system is further configured to, when the switch arrangement is in the third configuration:

in response to a determination to the effect that the voltage across the capacitor has decreased, switch the switch arrangement from the third configuration to the first configuration; and in response to a determination to the effect that the voltage across the capacitor and a voltage between the first and second input terminals of the DC electrical network are approximately equal, switch the switch arrangement from the first configuration to the second configuration.

5. The electrical power system of claim 1, wherein the control system is further configured to:

switch the switch arrangement from the second configuration to the first configuration in response to a determination to the effect that there is a fault in the DC electrical network.

6. The electrical power system of claim 1, wherein:

the power converter comprises an AC:DC converter circuit comprising a first half-bridge and a second half-bridge, each of the first half-bridge and the second half-bridge comprising a high-side power semiconductor switch and a low-side power semiconductor switch;

the control system is further configured to control switch states of the power semiconductor switches of the AC:DC converter circuit; and the control system is further configured to, before changing the configuration of the switch arrangement, switch the power semiconductor switches of the AC:DC converter circuit into a crowbar configuration in which only low-side transistors or only high-side transistors of the first and second half-bridges are switched on.

7. The electrical power system of claim 1, wherein the switch arrangement comprises:

a first switch connected in series between the resistor and the first input terminal of the DC electrical network;

a second switch connected in parallel across the resistor and the first switch; and a third switch connected in parallel across the capacitor and between the second input terminal of the DC electrical network and a node located between the resistor and the first switch, wherein:

in the first configuration, the first switch is closed and the second and third switches are open;

in the second configuration, the second switch is closed and the first and third switches are open; and in the third configuration, the second and third switches are closed and the first switch is open.

8. The electrical power system of claim 7, wherein the first switch and the third switch each comprise a power semiconductor switch, and the power semiconductor switches are connected in a half-bridge configuration.

9. The electrical power system of claim 8, wherein the power semiconductor switches are MOSFETs.

10. The electrical power system of claim 1, wherein the resistor is a non-linear resistor.

11. The electrical power system of claim 10, wherein the non-linear resistor is a current limiting diode.

12. The electrical power system of claim 1, wherein the power source is an AC power source and the power converter is an AC:DC power converter.

13. The electrical power system of claim 1, wherein the power source is a DC power source and the power converter is an DC:DC power converter.

14. The electrical power system of claim 13, wherein the DC:DC power converter is a Dual Active Bridge, DAB, DC:DC power converter comprising a DC:AC converter circuit, an AC:DC converter circuit and an AC link connecting respective AC sides of the DC:AC converter circuit and the AC:DC converter circuit.

15. An aircraft power and propulsion system comprising the electrical power system of claim 1.

16. A method of operating an electrical power system according to claim 1, the method comprising:

monitoring, by the control system, one or more operating parameters of the electrical power system;

in response to a change in one or more of the one or more operating parameters, changing a configuration of the switch arrangement.

17. The method of claim 16, comprising:

switching the switch arrangement to the first configuration for a start-up sequence of the electrical power system;

switching the switch arrangement from the first configuration to the second configuration when the start-up sequence is complete; and switching the switch arrangement from the second configuration to the third configuration in response to a determination to the effect that a voltage across the capacitor has increased past a threshold.

18. The method of claim 17, further comprising, after switching the switch arrangement to the third configuration:

switching the switch arrangement from the third configuration to the first configuration;

determining that the voltage across the capacitor and a voltage between the first and second input terminals of the DC electrical network are approximately equal; and switching the switch arrangement from the first configuration to the second configuration.

19. The method of claim 16, wherein the power converter comprises an AC:DC converter circuit comprising a first half-bridge and a second half-bridge, each of the first half-bridge and the second half-bridge comprising a high-side power semiconductor switch and a low-side power semiconductor switch, and the method further comprises:

prior to changing the configuration of the switch arrangement, switching a plurality of power semiconductor switches of the AC:DC converter circuit into a crowbar configuration.

20. An electrical power system, comprising:

an electrical power source;

a power converter connected, at an input side, to the electrical power source and comprising first and second DC output terminals and a capacitor connected between the first and second output terminals;

a DC electrical network having a first input terminal and a second input terminal;

a resistor;

a switch arrangement comprising a plurality of switches having:

a first configuration in which the resistor is connected in series between the first output terminal of the power converter and the first input terminal of the DC electrical network;

a second configuration in which the first output terminal of the power converter is connected to the first input terminal of the DC electrical network bypassing the resistor; and a third configuration in which the resistor is connected in parallel across the capacitor, wherein:

the electrical power system further comprises a control system for controlling a configuration of the switch arrangement, and resistor is a non-linear resistor.

* * * * *